United States Patent
Sampath et al.

(10) Patent No.: US 8,411,732 B2
(45) Date of Patent: Apr. 2, 2013

(54) FAST SQUARE ROOT ALGORITHM FOR MIMO EQUALIZATION

(75) Inventors: Hemanth Sampath, San Diego, CA (US); Dhananjay Ashok Gore, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1324 days.

(21) Appl. No.: 12/041,616

(22) Filed: Mar. 3, 2008

(65) Prior Publication Data

US 2008/0298452 A1 Dec. 4, 2008

Related U.S. Application Data

(60) Provisional application No. 60/896,039, filed on Mar. 21, 2007.

(51) Int. Cl.
  *H03H 7/30* (2006.01)
  *H04J 11/00* (2006.01)
  *H04B 7/216* (2006.01)
  *H04B 7/14* (2006.01)

(52) U.S. Cl. ........... 375/232; 370/208; 370/342; 455/25

(58) Field of Classification Search .................. 375/232; 370/208, 342
See application file for complete search history.

(56) References Cited

U.S. PATENT DOCUMENTS

| | | | |
|---|---|---|---|
| 4,949,296 A * | 8/1990 | Malinowski ................ | 708/605 |
| 5,075,694 A | 12/1991 | Donnangelo et al. | |
| 6,031,831 A * | 2/2000 | Tan Boon et al. ............ | 370/342 |
| 6,600,796 B1 | 7/2003 | Hassibi | |
| 2002/0154716 A1* | 10/2002 | Erving et al. ................. | 375/348 |
| 2003/0139139 A1* | 7/2003 | Onggosanusi et al. ......... | 455/63 |
| 2003/0154435 A1* | 8/2003 | Claussen et al. .............. | 714/755 |
| 2003/0165131 A1 | 9/2003 | Liang et al. | |
| 2004/0266383 A1* | 12/2004 | Mattellini et al. ............ | 455/307 |
| 2006/0098580 A1* | 5/2006 | Li et al. ........................ | 370/245 |

(Continued)

FOREIGN PATENT DOCUMENTS

| | | |
|---|---|---|
| JP | 2001196982 A | 7/2001 |
| JP | 2003017926 A | 1/2003 |

(Continued)

OTHER PUBLICATIONS

I Hassibi, "A Fast Square-Root Implementation for BLAST," Conference Record of the Thirty-Fourth I Asilomar Conference on Signals, Systems and Computers, Nov. 1, 2000, pp. 1255-1259, vol. I 2, IEEE, Piscataway, N J, USA, XP010535203.*

(Continued)

*Primary Examiner* — David C. Payne
*Assistant Examiner* — Sarah Hassan
(74) *Attorney, Agent, or Firm* — Donald C. Kordich

(57) ABSTRACT

Systems and methodologies are described that facilitate equalization of received signals in a wireless communication environment. Using multiple transmit and/or receive antennas and MIMO technology, multiple data streams can be transmitted within a single tone. During equalization, receivers can separate data received within a tone into individual data streams. The equalization process generally is computationally expensive. Equalizer functions include the inverse operation, which can be computed using the fast square root method; however, the fast square root method involves large numbers of computations for a set of matrices, where the size of a matrix in the set of matrices increases with the number of transmit or receive antennas. Utilizing a modification of the fast square root method, a subset of the elements of the matrices can be selected and updated to reduce the number and/or complexity of computations.

14 Claims, 15 Drawing Sheets

U.S. PATENT DOCUMENTS

| | | | |
|---|---|---|---|
| 2006/0182017 A1* | 8/2006 | Hansen et al. | 370/208 |
| 2006/0198310 A1 | 9/2006 | Stieglitz et al. | |
| 2006/0222096 A1 | 10/2006 | Guo et al. | |
| 2006/0270343 A1* | 11/2006 | Cha et al. | 455/25 |
| 2006/0270352 A1* | 11/2006 | Webster et al. | 455/63.4 |
| 2007/0064830 A1* | 3/2007 | Choi et al. | 375/267 |
| 2007/0117590 A1* | 5/2007 | Aldana | 455/562.1 |
| 2009/0080508 A1 | 3/2009 | Gore et al. | |

FOREIGN PATENT DOCUMENTS

| | | |
|---|---|---|
| KR | 20040018527 | 3/2004 |
| KR | 20070012308 A | 1/2007 |
| KR | 20070020390 | 2/2007 |
| WO | WO2004095730 A1 | 11/2004 |
| WO | WO2006092877 A1 | 9/2006 |

OTHER PUBLICATIONS

Chin et al., "An Improved Square-Root Algorithm for BLAST," IEEE Signal Processing Letters, Sep. 2004, pp. 772-775, vol. 11, No. 9, IEEE, Piscataway, N J, USA, XP011117274.*

Chin et al, "An Improved Square ROot Algorithm for BLAST" IEEE, Sep. 2004.*

Hassibi "A Fast Square ROOt IMplementation for BLAST" IEEE, Nov. 1, 2000.*

Taiwan Search Report—TW097110162—TIPO—Aug. 2, 2011.

International Search Report, PCT/US2008/057545, International Searching Authority, European Patent Office, Jan. 5, 2009.

Written Opinion, PCT/US2008/057545, International Searching Authority, European Patent Office, Jan. 5, 2009.

Chin et al., "An Improved Square-Root Algorithm for BLAST," IEEE Signal Processing Letters, Sep. 2004, pp. 772-775, vol. 11, No. 9, IEEE, Piscataway, NJ, USA, XP011117274.

Hassibi, "A Fast Square-Root Implementation for BLAST," Conference Record of the Thirty-Fourth Asilomar Conference on Signals, Systems and Computers, Nov. 1, 2000, pp. 1255-1259, vol. 2, IEEE, Piscataway, NJ, USA, XP010535203.

Golub and Van Loan, "Matrix Computations—Third Edition," Section 5.1: "Householder and Givens Matrices," 1996, John Hopkins University Press, Baltimore, MD, USA, XP002507967.

Wang et al., "Fast Square-Root Detection Algorithm for V-BLAST," International Conference on Wireless Communications, Networking and Mobile Computing (WICOM) 2007, Sep. 21, 2007, pp. 1340-1343, IEEE, Piscataway, NJ, USA, XP031261514.

* cited by examiner $$y_{11} \longleftarrow y_{11} \times U_{1,1} + y_{1,k+1} \times U_{2,1}$$

$$y_{2:k,1} \longleftarrow y_{2:k,1} \times U_{1,1} + y_{2:k,k+1} \times U_{2,1}, \quad k \geq 2$$

$$y_{2:k,k+1} \longleftarrow y_{2:k,1} \times U_{1,2} + y_{2:k,k+1} \times U_{2,2}, \quad k \geq 2$$

FAST SQUARE ROOT ALGORITHM FOR MIMO EQUALIZATION

CLAIM OF PRIORITY UNDER 35 U.S.C. §119

This application for patent claims the benefit of U.S. Provisional Application Ser. No. 60/896,039 filed on Mar. 21, 2007, and entitled "MIMO-MMSE EQUALIZATION USING FAST SQUARE ROOT ALGORITHM" The entirety of this application is expressly incorporated herein by reference.

BACKGROUND

I. Field

The subject specification relates generally to wireless communications, and, more particularly, to facilitation of equalization of a wireless signal communicated within a multiple-input multiple-output (MIMO) operation.

II. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension. The MIMO system can provide improved performance (e.g., higher throughput, greater capacity, or improved reliability) if the additional dimensionalities created by the multiple transmit and receive antennas are utilized.

In a MIMO communication system, as NT and NR increases, the efficiency of equalization algorithm degrades due to the increased size of matrices involved in the computation. Thus, there is a need for an efficient equalization in wireless devices and base station that operated with a MIMO configuration.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating equalization. Access points and terminals can include multiple transmit and/or receive antennas and utilize MIMO technology to enhance performance. Using MIMO technology, multiple data streams can be transmitted within a single tone. During equalization, receivers separate data received within a tone into individual data streams. In general, the equalization process is computationally intensive. An equalizer matrix is computed for each tone within a tile using an equalizer function. Such function typically utilizes an inverse operation, which can be computed using the fast square root method. However, the fast square root method involves a significant number of computations for a set of matrices, where size of involved matrices increases as the number of transmit or receive antennas is increased. A modification of the fast square root method can be used to reduce the number and/or complexity of computations. In such modification, only a portion of the fast square root matrices are updated. In addition, fast square root matrices can be modified to reduce dynamic range requirements during processing.

In an aspect, a method for facilitating equalization in a receiver chain in a wireless communication system is described, the method comprising: generating an equalizer matrix for a tone of a received signal, the equalizer matrix is a function of an inverse matrix computed based at least in part upon a partial update of a subset of elements of a fast square root matrix; and equalizing the tone as a function of the equalizer matrix.

In another aspect, a device that that facilitates equalization of a signal in a wireless environment is disclosed, the device comprising: means for generating an equalizer matrix utilizing a modified fast square root method that updates a subset of the fast square root matrix during iterative processing; and means for separating at least one data stream in a received signal utilizing the equalizer matrix.

In a further aspect, the subject specification discloses an apparatus that facilitates equalization in a wireless communication environment, the apparatus comprising: a processor configured to compute an inverse matrix based at least in part upon an iterative partial update of a fast square root matrix, to compute an equalizer matrix as a function of the inverse matrix, and to obtain at least one data stream from a received signal utilizing the equalizer matrix; and a memory coupled to the processor.

In a further yet aspect, the subject specification describes a computer program product including a computer-readable medium comprising: code for causing a computer to calculate an equalizer matrix for a tone of a received signal, wherein calculation of the equalizer matrix is based upon iterative partial update of a fast square root matrix; and code for causing a computer to equalize the received signal as a function of the equalizer matrix.

To the accomplishment of the foregoing and related ends, the one or more aspects comprise the features hereinafter fully described and particularly pointed out in the claims. The following description and the annexed drawings set forth in detail certain illustrative aspects. These aspects are indicative, however, of but a few of the various ways in which the principles described herein may be employed and the described aspects are intended to include their equivalents.

DETAILED DESCRIPTION

Figure 1:
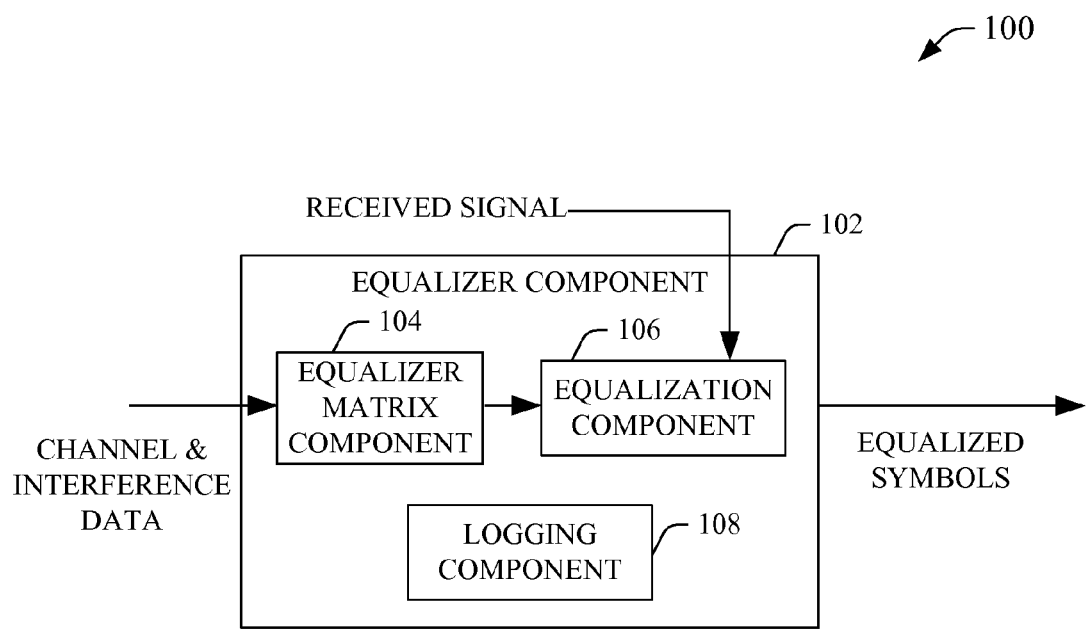
FIG. 1 is a block diagram of an example system that equalizes signals in accordance with one or more aspects presented herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In addition, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, various aspects are described herein in connection with a terminal. A terminal can also be called a system, a user device, a subscriber unit, subscriber station, mobile station, mobile device, remote station, access point, base station, remote terminal, access terminal, user terminal, terminal, user agent, or user equipment (UE). A terminal can be a cellular telephone, a cordless telephone, a Session Initiation Protocol (SIP) phone, a wireless local loop (WLL) station, a PDA, a handheld device having wireless connection capability, or other processing device connected to a wireless modem.

Turning now to the Figures, FIG. 1 illustrates a system 100 that performs equalization of a received signal in a wireless system capable of utilizing multiple receive and/or transmit antennas. In systems utilizing MIMO technology, multiple data streams can be transmitted over a single subcarrier, where each data stream is transmitted from a different antenna. At the receiver, the data streams can be separated, in a process referred to herein as equalization, to provide for communication. The terms data stream and layer are used interchangeably herein. Also, the rank of a signal or transmission is equal to the number of layers of the transmission, where the maximum rank of a transmission is equal to the lesser of the number of transmit antennas or receive antennas. Generally, equalization is a computationally expensive process. Reduction of number and complexity of computations required for equalization can decrease power required to operate a receiver, increasing battery life for a device utilizing the receiver. In addition, a chip or hardware component that performs fewer or less complex operations can be reduced in size, providing room for additional hardware or reductions in the size of the terminal that utilizes the component.

An equalizer component 102 can be used to separate the received data streams. In particular, equalizer component can be a minimum mean square error (MMSE) equalizer. Although the MMSE equalizer components and operations described herein can be used where the rank, or number of layers, of the transmission is equal to one, in such cases performance may be less efficient. When the rank is equal to one, equalization component can utilize alternative processes, such as maximum ratio combining (MRC) equalization. Alternatively, a separate MRC equalization component (not shown) can be utilized.

The received signal for a tone or subcarrier, n, can be represented as follows:

$$x(n) = H(n)s(n) + v(n)$$

Here, v(n) is a $M_R \times 1$ noise vector with:

$$R_{vv} = E_n[v(n)v(n)^*] = \begin{bmatrix} \sigma_1^2 & 0 & & 0 \\ 0 & \sigma_2^2 & & \\ & & \ldots & 0 \\ 0 & & 0 & \sigma_{M_R}^2 \end{bmatrix}$$

H(n) is a $M_R \times M_T$ matrix that represents the MIMO channel. H(n) can be denoted as follows:

$$H(n) = \begin{bmatrix} H_1(n) \\ H_2(n) \\ H_3(n) \\ \ldots \\ H_{M_R}(n) \end{bmatrix} = \begin{bmatrix} h_{11}(n) & h_{12}(n) & \ldots & h_{1M_T}(n) \\ h_{21}(n) & h_{22}(n) & \ldots & \ldots \\ \ldots & \ldots & \ldots & \ldots \\ h_{M_R 1}(n) & \ldots & \ldots & h_{M_R M_T}(n) \end{bmatrix}$$

The transmit symbol is represented by $M_T \times 1$ vector s(n):

$$s(n) = \begin{bmatrix} s_1(n) \\ s_2(n) \\ \ldots \\ \ldots \\ s_{M_T}(n) \end{bmatrix}$$

Normalized channel matrix elements $\hat{h}_{ij}(n)$, and scaled received signal elements $\hat{x}_i(n)$, can be represented as follows:

$$\hat{h}_{ij}(n) = h_{i,j}(n)\frac{\sigma_{min}}{\sigma_i}, \quad i = 1, 2, \ldots M_R$$

$$\hat{x}_i(n) = x_i(n)\frac{\sigma_{min}}{\sigma_i}, \quad i = 1, 2, \ldots M_R$$

Here, $\sigma_{min}^2$ is the minimum interference variance across all receive antennas. For a given tile, $\sigma_{min}^2$ is a fixed parameter. In addition, normalized channel elements, $\hat{h}_{ij}(n)$, where j is greater than the rank, or number of MIMO layers in the transmission, are set to zero. It is noted that a tile as referred to herein is a time frequency region that comprises a predetermined number of successive tones for a fixed number of successive OFDM symbols. For instance, a tile can include 128 symbols over 16 tones or channels. Symbols can include data symbols as well as pilot symbols, which can be used as references to determine performance, e.g., a channel estimate.

Equalizer component 102 can (i) utilize channel and interference information to equalize received signals and generate equalized symbols; (ii) process received signals on a per tile basis; (iii) generate an equalizer matrix for each tone within a tile, where the received signal for a tone can be separated into individual data streams utilizing the equalizer matrix. The equalized symbols can be denoted as follows:

$$\tilde{s}(n) = G(n)\hat{x}(n)$$

Here, $\tilde{s}(n)$ represents normalized equalized symbols for tone n, G(n) is the equalizer matrix, and $\hat{x}(n)$ is the received signal for tone n.

Equalizer component 102 includes an equalizer matrix component 104 that generates the equalizer matrix G(n) and an equalization component 106 that produces equalized symbols as a function of the equalizer matrix. The equalizer matrix component 104 can utilize channel and interference information (e.g., channel and interference estimates) related to the tile considered to generate the equalizer matrix. As used herein, a channel estimate is an estimate of the response of a wireless channel from a transmitter to a receiver. Channel estimation is typically performed by transmitting pilot symbols within the tiles that are known a priori by both the transmitter and receiver. Interference can result from multiple transmitters transmitting their pilot signals simultaneously. Such transmitters can be located at different access points within a wireless environment, or can be different antennas of the same access point. Pilot interference degrades the quality of the channel estimate. The power of the interference for the time-frequency region or tile is estimated and referred to herein as the interference estimate. Equalization component 106 can utilize the resulting equalizer matrix to process received signals and generate equalized symbols.

In general, computations required to generate the equalizer matrix are complex and increase rapidly as the number of transmit or receive antennas increases. The equalizer is a $M_T \times M_R$ matrix, where $M_T$ is the effective number of transmit antennas at the access point and $M_R$ is the number of receive antennas at the access terminal. The equalizer matrix can be represented as follows:

$$G(n) = \Lambda(n)^{-1}[\hat{H}(n)^*\hat{H}(n) + \sigma_{min}^2 I]^{-1}\hat{H}(n)^*$$

for tone n. The equalizer matrix can be rewritten as follows:

$$G(n) = \Lambda(n)^{-1}P(n)\hat{H}(n)^*$$

P(n) represents the inverse matrix, defined as follows:

$$P(n) = [\hat{H}(n)^*\hat{H}(n) + \sigma_{min}^2 I]^{-1}$$

where $\hat{H}(n)$ corresponds to a normalized H(n) matrix. Term $\Lambda(n)$ is a matrix of signal to interference-plus-noise ratio values (SINRs) and can be represented as follows:

$$\Lambda(n) = \begin{bmatrix} \lambda_1(n) & 0 & & 0 \\ 0 & \lambda_2(n) & & \\ & & \ldots & 0 \\ & & 0 & \lambda_R(n) \end{bmatrix}$$

Where $\lambda_j(n)$ is defined in terms of the diagonal matrix elements of P(n):

$$\lambda_j(n) = 1 - P_{jj}(n).$$

Typically, the inverse matrix P(n) is computed using the fast square root method. The fast square root method utilizes a set of matrices, described in detail below, to perform recursive computations that can be used to obtain the inverse matrix. However, the matrices used within the common fast square root method contain terms that are unnecessary for computation of the inverse matrix. Consequently, a modified fast square root method can be utilized to efficiently perform the matrix inversion, using modified matrices and recursions to reduce or minimize the number of required calculations. Equalizer matrix component 104 can utilize such modified fast square root method to reduce computational expense (e.g., runtime, memory) and facilitate equalizer matrix generation. Details of the modified fast square root method are discussed below.

Equalizer component 102 can also include a logging component 108 that records demodulated symbols and additional information. The logging packet can include additional data, such as an identifier for the hardware block generating the logging packet, a forward link system frame number, an identifier for the serving sector, a number of tiles logged in the packet, a tile index, a number of symbols logged for one tile, the number of layers, the complex estimated symbol output for each layer and SINRs per layer. In an aspect, data can be logged once per forward link frame.

Figure 2:
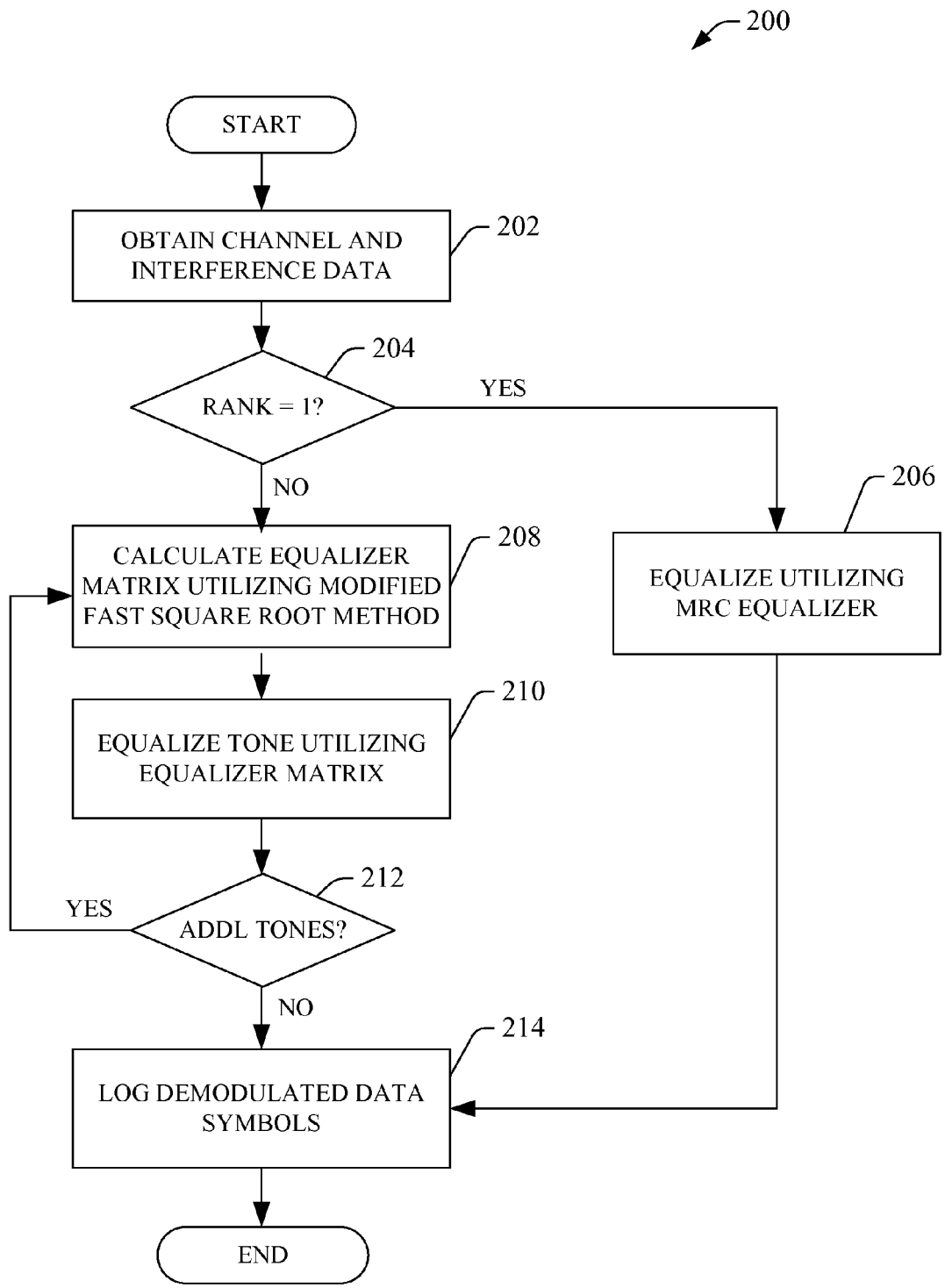
FIG. 2 illustrates an example methodology for equalizing a received signal in accordance with one or more aspects presented herein.

FIG. 2 presents a flowchart of an example method 200 that facilitates equalization of a transmitted tile. At act 202, channel and interference data for a tile are obtained. In particular, channel estimates can be generated based upon pilot symbols included within a tile. Separate channel matrices $\hat{H}(n)$ are generated for each received tone n. Consequently, for each modulation symbol, a vector of channel matrices corresponding to the received tile is obtained. Similarly, interference information corresponding to the received tile is also obtained.

At 204, a determination can be made as to whether the rank of the transmission is equal to one. If yes, MMSE equalization may not be the most efficient process for equalization. Accordingly, the signal can be equalized using an alternative process, such as MRC equalization at 206. If no, an equalizer matrix can be generated for a tone utilizing a modified fast square root method at 208. The modified fast square root method can utilize matrices of the standard fast square root method. However, only a subset of the elements of the matrices need be updated. Consequently, for each iteration of the recursive calculation, a fraction of the common fast square root method calculations are performed, resulting in significantly fewer computations. The generated equalizer matrices can be used to generate equalized symbols for the tone at 210.

At act 212, a determination is made as to whether there are additional tones in the tile to be equalized. If yes, the process returns to 208, where an equalizer matrix is generated for the next tone. If no, the process terminates for the particular tile. At 214, demodulated data symbols can be logged. In particular, an MMSE logging packet can include MMSE demodulated (estimated) data symbols from one or more tiles from the same frame. In an aspect, data can be logged once per forward link frame. The logging packet can include additional data, such as an identifier for the hardware block generating the logging packet, a forward link system frame number, an identifier for the serving sector, number of tiles logged in the packet, a tile index, a number of symbols logged for a tile, a number of layers, a complex estimated symbol output for each layer and SINRs per layer. Methodology 200 can be repeated for multiple received tiles.

Figure 3:
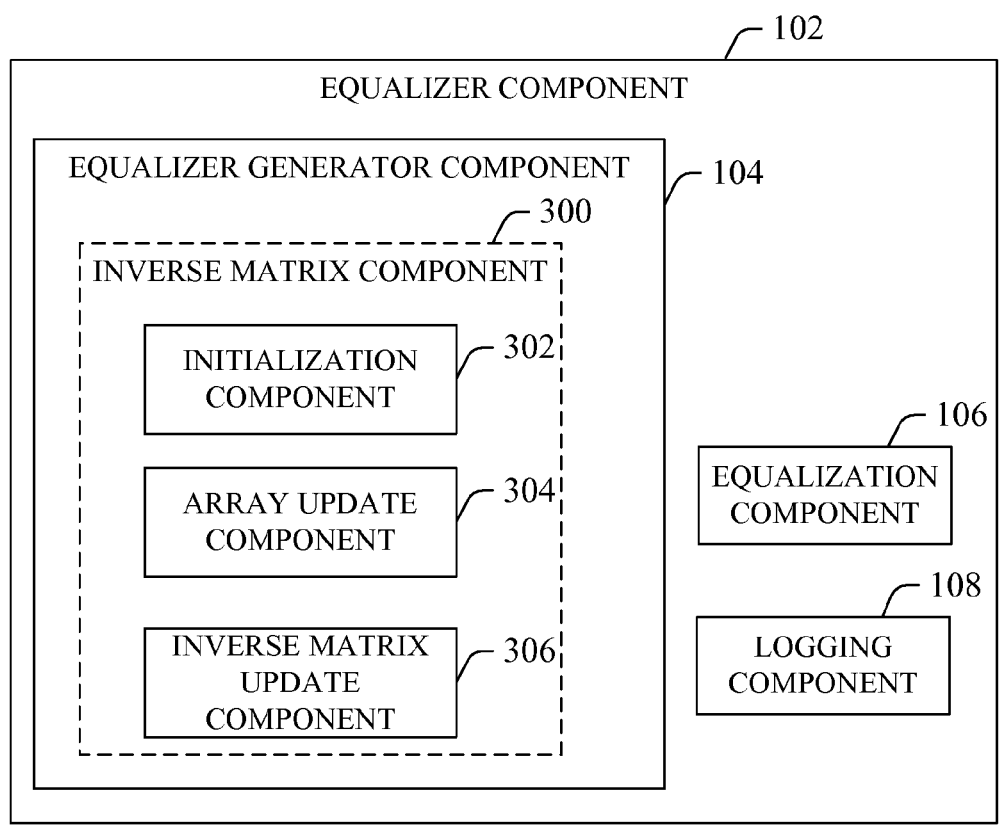
FIG. 3 is a block diagram of an equalizer that utilizes modified fast square root algorithm in accordance with one or more aspects presented herein.

FIG. 3 illustrates an equalizer component 102 that utilizes a simplified, efficient equalization procedure. Equalizer component 102 can include an inverse matrix component 300 that computes an inverse matrix P(n) utilizing a modification of the common fast square root method as it is known in the art. The fast square root method utilizes a set of matrices, referred to herein as the fast square root matrices or the pre-array and post-array matrices. Inverse matrix component 300 can include an initialization component 302 that performs operations to initialize the fast square root method matrices. An array update component 304 can modify or update the elements of the pre-array and post-array during iterative processing. In particular, only a subset of the elements is necessary for inverse matrix computation. Consequently, array update component 304 can update a subset of the pre-array and post-array matrices. An inverse matrix update component 306 can generate the inverse matrix according to the modified fast square method. The generated equalizer matrix can be utilized by equalization component 106, and the results logged by logging component 108.

Consider a QR decomposition of the channel matrix augmented with minimum interference variance $\sigma_{min}$ and identity matrix I:

$$\begin{bmatrix} \hat{H}(n) \\ \sigma_{min} I \end{bmatrix} = Q(n)R(n) = \begin{bmatrix} Q_a(n) \\ Q_2(n) \end{bmatrix} R(n)$$

Here, $Q_a$ has dimensions $M_T \times M_R$ and Q has dimensions $(M_T + M_R) \times M_T$. Using the QR decomposition, the equalizer matrix can be written as follows:

$$G(n) = \Lambda(n)^{-1} R(n)^{-1} Q_a^*(n)$$

where $R(n)^{-1} = P(n)^{1/2}$ and $Q_a^*(n) = P(n)^{*1/2} \hat{H}(n)^*$. This equation can also be expressed as follows:

$$G(n) = \Lambda(n)^{-1} P(n)^{1/2} P(n)^{*1/2} \hat{H}(n)^*$$

Such expression can be computed more efficiently than the previous equation. Here, $P(n)^{1/2}$ can be computed as follows:

$$P_{|i}(n)^{1/2} = \left[ \sum_{j=1}^{i} \hat{H}_j(n) \hat{H}_j(n)^* + \sigma_{min}^2 I \right]^{-1/2}$$

where $\hat{H}_j(n)$ is the j-th row of $\hat{H}(n)$. Matrices $P(n)^{1/2}$ and $Q_a^*(n)$ can be obtained using recursive processing of the following fast square root matrices:

$$\begin{bmatrix} 1 & \hat{H}_i(n) P_{|i-1}(n)^{1/2} \\ 0 & P_{|i-1}(n)^{1/2} \\ -e_i & B_{i-1}(n) \end{bmatrix} \Theta_i = \begin{bmatrix} r_{e,i}^{1/2} & 0 \\ K_{p,i} & P_{|i}(n)^{1/2} \\ -e_i & B_i(n) \end{bmatrix}$$

$$P_{|0}^{1/2}(n) = \frac{1}{\sigma} I_{MT \times MT}, \quad B_0(n) = 0_{MR \times MT}$$

$P_{|0}^{1/2}(n)$ is initialized to an identity matrix $I_{MT \times MT}$, with dimensions $M_T \times M_T$, multiplied by $1/\sigma$. $B_0(n)$ is initialized to a zero matrix with dimensions $M_R \times M_T$. Here, $e_i$ is the i-th unit vector of dimension $M_R$ and $\hat{H}_i(n)$ is the i-th row of $\hat{H}(n)$.

$P(n)^{1/2}$ can be calculated by generating and updating the matrices for i=1, 2, 3 . . . $M_R$. After $M_R$ iterations, $P(n)^{1/2} = P_{|M_R - 1}(n)^{1/2}$ and $Q_a(n) = B_{M_R}(n)$. It is computationally more demanding to calculate $P(n)^{1/2}$ and $Q_a(n)$ to be used in the equalizer expression:

$$G(n) = \Lambda(n)^{-1} R(n)^{-1} Q_a^*(n)$$

Instead only $P(n)^{1/2}$ need be computed and the rewritten equalizer expression can be used:

$$G(n) = \Lambda(n)^{-1} P(n)^{1/2} P(n)^{*1/2} \hat{H}(n)^*$$

Required computations can also be reduced by decreasing the dynamic requirements for the computations. Typically, during initialization of the fast square root method, the identity matrix $I_{MT \times MT}$ is multiplied by $1/\sigma$, $$P_{|0}^{1/2}(n) = \frac{1}{\sigma} I_{MT \times MT}.$$

Such an operation can result in relatively large numbers and dynamic ranges for initialization. This large dynamic range can require additional bits to maintain data and perform calculations. The dynamic range can be avoided by a simple multiplication by interference. In particular, the pre-array and post-array matrices can be updated using the following expression:

$$\hat{P}_{|i}(n)^{1/2} = P_{|i}(n)^{1/2} \sigma_{min}$$

Initialization component 302 and array update component 304 can utilize the described modification to facilitate processing. The following description of the modified fast square root method utilizes this feature to reduce dynamic ranges. However, the computations for the modified square root method using a partial update of the fast square root matrices can be performed without utilizing this feature.

A subset of the fast square root matrices can be updated to compute $\hat{P}_{|i}(n)^{1/2}$. In particular, during iterative processing only partial fast square root matrices are updated:

$$\begin{bmatrix} \sigma_{min} & \hat{H}_i(n)\hat{P}_{|i-1}(n)^{1/2} \\ 0 & \hat{P}_{|i-1}(n)^{1/2} \end{bmatrix} \Theta_i = \begin{bmatrix} r_{e,i}^{1/2}\sigma_{min} & 0 \\ \hat{K}_{p,i} & \hat{P}_{|i}(n)^{1/2} \end{bmatrix}$$

$$\hat{P}_{|0}^{1/2}(n) = I_{M_T \times M_T}$$

Here, $\hat{P}_{|i}(n)^{1/2} = P_{|i}(n)^{1/2}\sigma_{min}$. Here, $\hat{P}_{|0}^{1/2}(n)$ is initialized to the identity matrix $I_{M_T \times M_T}$. The fast square root matrix utilized in the recursive process:

$$X = \begin{bmatrix} \sigma_{min} & \hat{H}_i(n)\hat{P}_{|i-1}(n)^{1/2} \\ 0 & \hat{P}_{|i-1}(n)^{1/2} \end{bmatrix}$$

is referred to as the pre-array matrix, X. While the second fast square root matrix:

$$Y = \begin{bmatrix} r_{e,i}^{1/2}\sigma_{min} & 0 \\ \hat{K}_{p,i} & \hat{P}_{|i}(n)^{1/2} \end{bmatrix}$$

is referred to as the post-array matrix, Y. The inverse matrix, $\hat{P}_{|i}(n)^{1/2}$, can be recursively computed utilizing these modified fast square root matrices or arrays.

Figure 4:
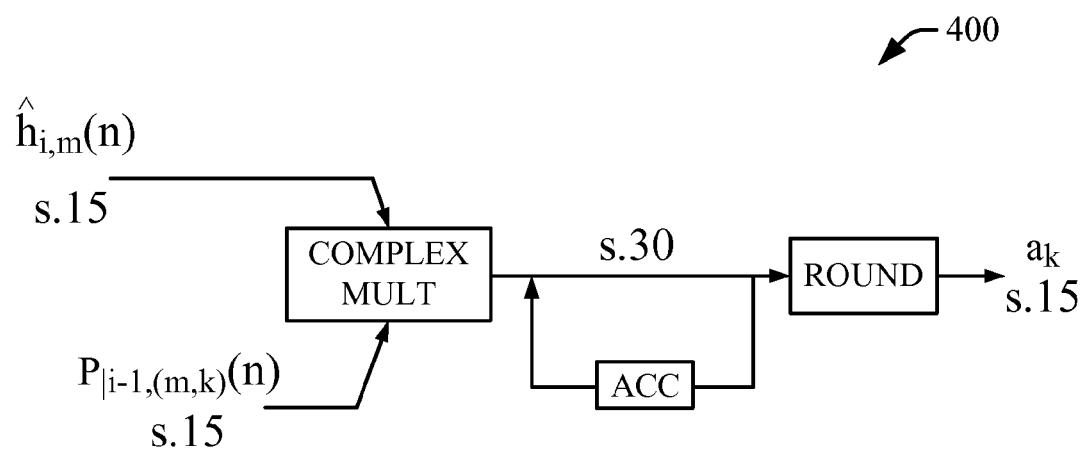
FIG. 4 is a block diagram of an initialization process for a fast square root method pre-array matrix in accordance with one or more aspects presented herein.

FIG. 4 depicts a representation of an initialization process for a pre-array matrix. During initialization of the pre-array matrix, vector a can be computed utilizing the following equation:

$$a = \hat{H}_i(n)\hat{P}_{|i-1}(n)^{1/2}$$

Such a computation can be performed using the following example pseudocode:

```
for k = 1 : M_T
    acc_C = 0
    for m = 1 : M_T
        acc_C = acc_C + ĥ_{i,m}(n)P̂_{|i-1,(m,k)}(n)
    end;
    a_k = acc_C;
end;
```

Diagram 400 depicts example operations for calculating vector a. Initialization component 302 can also initialize $\hat{P}_{|0}^{1/2}(n)$ to the identity matrix $I_{M_T \times M_T}$. In addition, initialization component 302 can initialize the post-array to the pre-array, as follows:

$$Y = X = \begin{bmatrix} s_f \sigma_{min} & a \\ 0 & \hat{P}_{|i-1}(n)^{1/2} \end{bmatrix}$$

Here, $s_f$ is an input power of two scaling factors that can be implemented with a right-shift operation.

Array update component 304 can update the pre-array matrix, rotation matrix $\Theta_i$, and post-array matrix during iterative processing of the square root method. In particular, during processing, for each receive antenna $i=1, 2 \ldots M_R$ the pre-array matrix can be computed, the rotation and post-array matrices can be updated for every transmit antenna, $k=1, 2, \ldots M_T$, and an element of the inverse matrix can be generated. Array update component 304 can compute the $(M_T+1) \times (M_T+1)$ rotation matrix $\Theta_i$ and update the post-array matrix, as a function of the rotation matrix and pre-array, $Y = X\Theta_i$.

During update of the rotation and post-array matrices, the computations are repeated for each transmit antenna, $k=1, 2, \ldots M_T$. The rotation matrix $\Theta_i$ can be written as the product:

$$\Theta_i = \theta_i^1 \theta_i^2 \theta_i^3 \ldots \theta_i^{M_T}$$

where $\theta_i^k$ is a Givens matrix of the form:

$$\theta_i^k = \begin{bmatrix} c & \ldots & s & & 0 \\ \ldots & \ldots & \ldots & & \\ 0 & \ldots & 1 & 0 & \\ -e \times s & & 0 & e \times c & \\ & & & & 1 & 0 \\ 0 & & & & 0 & 1 \end{bmatrix}$$

Computation of the values c, s, and e that are utilized to form the $(1,1), (1,k), (k,1), (k,k)^{th}$ entries of the rotation matrix $\theta_i^k$ is described below. Since the rotation matrix can be written as the product $\Theta_i = \theta_i^1 \theta_i^2 \theta_i^{M_T}$, the post array matrix Y can be updated in a recursive fashion, after the post-array matrix is initialized to the pre-array matrix, $Y \leftarrow X$.

Figure 5:
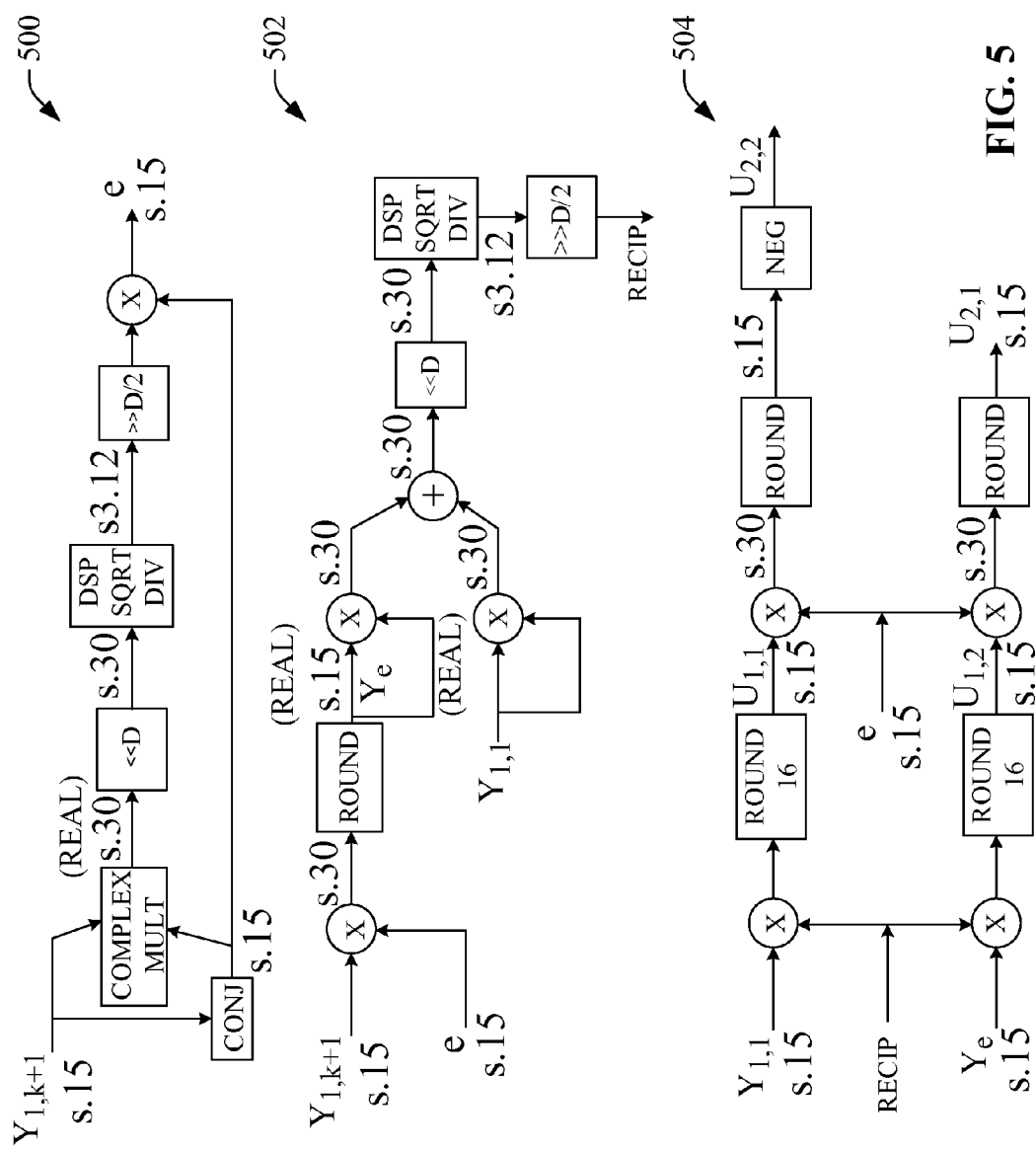
FIG. 5 depicts block diagrams of array update processes for a post-array matrix in accordance with one or more aspects presented herein.

FIG. 5 depicts representations of array update processes for a post-array matrix. Update array component 304 can compute the values c, s and e for the Givens matrix above as follows:

$$e = \frac{y_{ik}^*}{\|y_{1k}\|}$$

$$c = \frac{y_{11}}{\sqrt{\|y_{1k}\|^2 + y_{11}^2}}$$

$$s = \frac{\|y_{12}\|}{\sqrt{\|y_{1k}\|^2 + y_{11}^2}}$$

Here, $y_{ij}$ is the (i, j) element of matrix Y for transmit antenna k. The following matrix can be formed:

$$U = \begin{bmatrix} c & s \\ -es & ec \end{bmatrix},$$

where the $(1,1), (1,k), (k,1), (k,k)$ entries of the matrix $\theta_i^k$ are set to be equal to the $(1,1), (1,2), (2,1), (2,2)$ entries of the matrix U, respectively. Diagrams 500, 502, and 504 depict a set of exemplary operations for calculating the elements of the U matrix. In particular, diagram 500 depicts operations that generate the variable e, which can be used in the operations illustrated in diagrams 502 and 504 to generate elements of the U matrix, $U_{11}$, $U_{12}$, $U_{21}$, and $U_{22}$.

Figure 6:
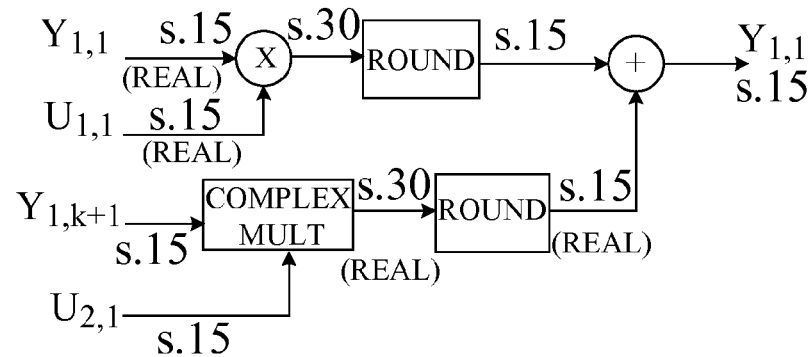
FIG. 6 depicts block diagrams of additional array update processes for a post-array matrix in accordance with one or more aspects presented herein.
Figure 6:
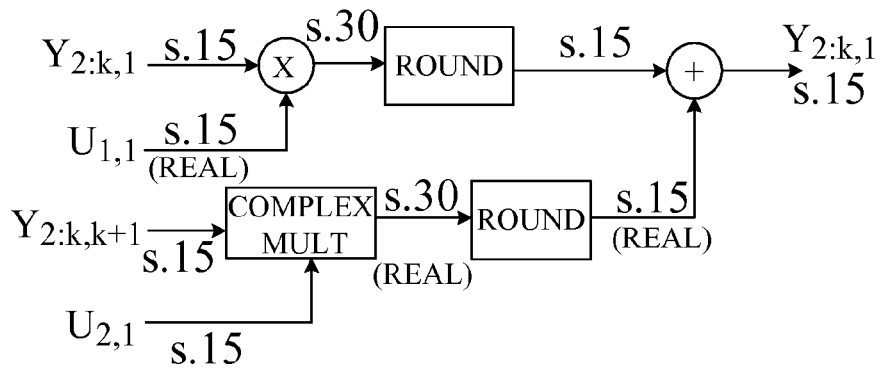
Figure 6:
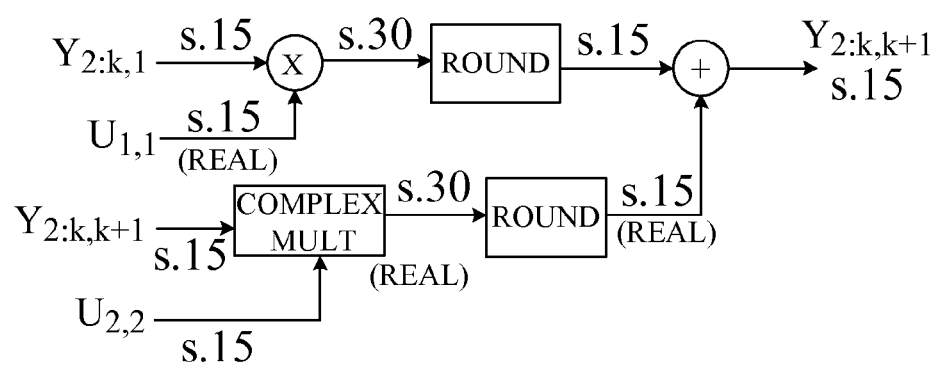
Figure 7:
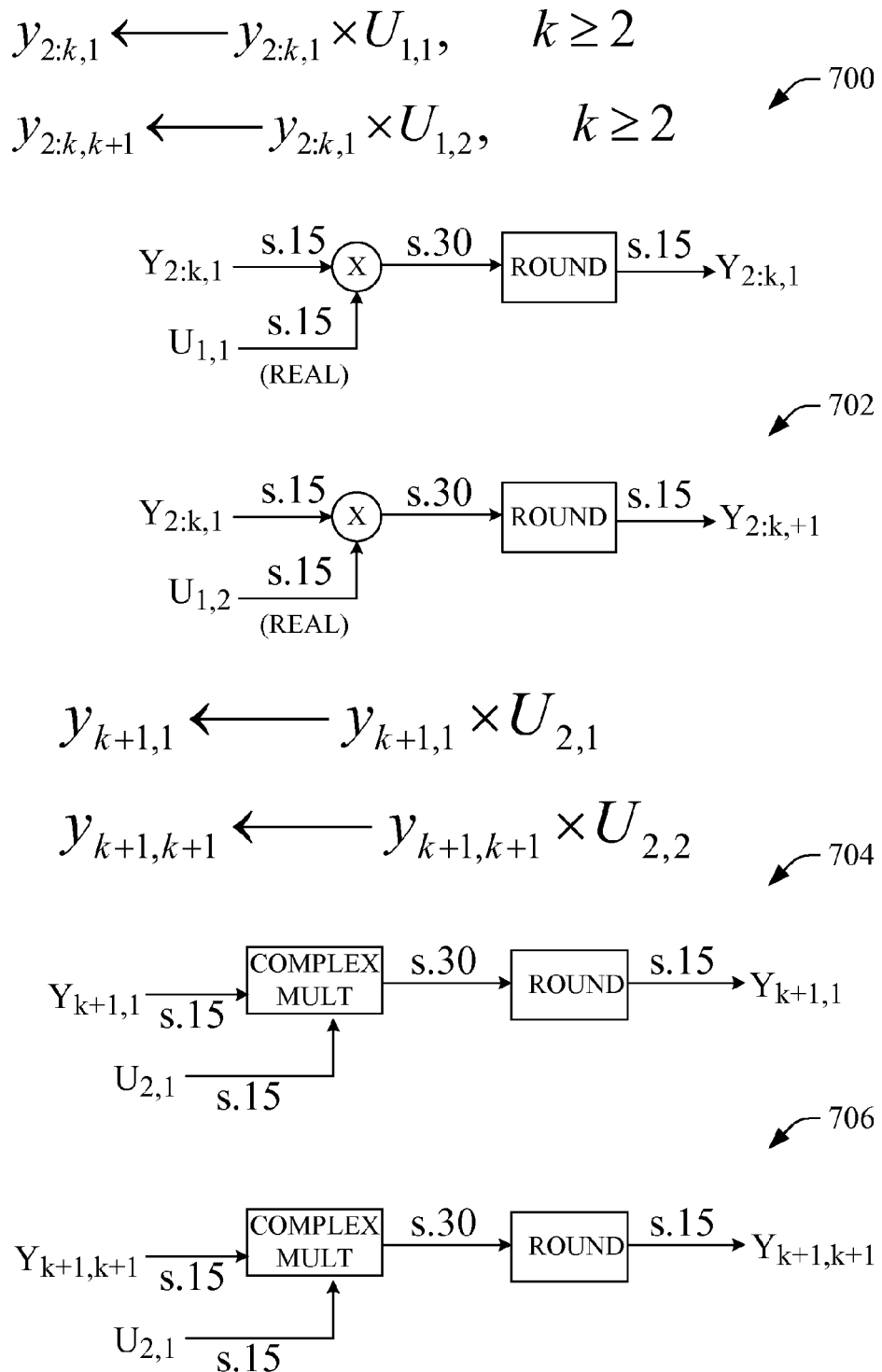
FIG. 7 depicts block diagrams of further array update processes for a post-array matrix in accordance with one or more aspects presented herein.

FIGS. 6 and 7 depict further representations of array update operations for a post-array matrix. Array update component 304 can update the post array matrix Y as follows:

$$Y \leftarrow Y \times \theta_i^k$$

However, array update component 304 can update a subset of the post-array matrix because only $R(n)^{-1}$ from the matrix Y need be computed. Consequently, only selected elements of post-array matrix Y can be updated as follows:

$$y_{11} \leftarrow y_{11} \times U_{1,1} + y_{1k+1} \times U_{2,1} \quad (a)$$

$$y_{2:k,1} \leftarrow y_{2:k,1} \times U_{11} + y_{2:k,k+1} \times U_{21}, \; k \geq 2$$

$$y_{2:k,k+1} \leftarrow y_{2:k,1} \times U_{12} + y_{2:k,k+1} \times U_{22}, \; k \geq 2 \quad (b)$$

$$y_{k+1,1} \leftarrow y_{k+1,1} \times U_{21}$$

$$y_{k+1,k+1} \leftarrow y_{k+1,k+1} \times U_{22} \quad (c)$$

Diagram 600 illustrates operations for calculating $Y_{11}$, while diagrams 602 and 604 illustrate operations for calculating $Y_{2:k,1}$ and $Y_{2:k,k+1}$, respectively.

FIG. 7 depicts additional representations of array update operations for a post-array matrix. Further savings in complexity can be attained because $U_{11}$, $U_{12}$ and $y_{11}$ are real numbers. Furthermore, for the first iteration (i=1) of the update process, equations (b) above can be simplified as follows:

$$y_{2:k,1} \leftarrow y_{2:k,1} \times U_{11}, \; k \geq 2$$

$$y_{2:k,k+1} \leftarrow y_{2:k,1} \times U_{12}, \; k \geq 2$$

Diagrams 700 and 702 illustrate simplified operations for calculating $Y_{2:k,1}$ and $Y_{2:k,k+1}$, respectively. Additionally, diagrams 704 and 706 illustrate operations for calculating $Y_{k+1,1}$ and $Y_{k+1,k+1}$, respectively.

Inverse matrix update component 306 can update the inverse matrix based upon the iterative computation of the post-array matrix as follows:

$$\hat{P}_{|i}(n)^{1/2} = Y_{2:M_T, 2:M_T}$$

Array update component 304 can utilize the computed inverse matrix to update selected portions of the pre-array matrix. Equalizer generator component 104 can utilize the inverse matrix to compute the equalizer matrix, which is used by the equalization component 106 to perform equalization of the received signal.

Figure 8:
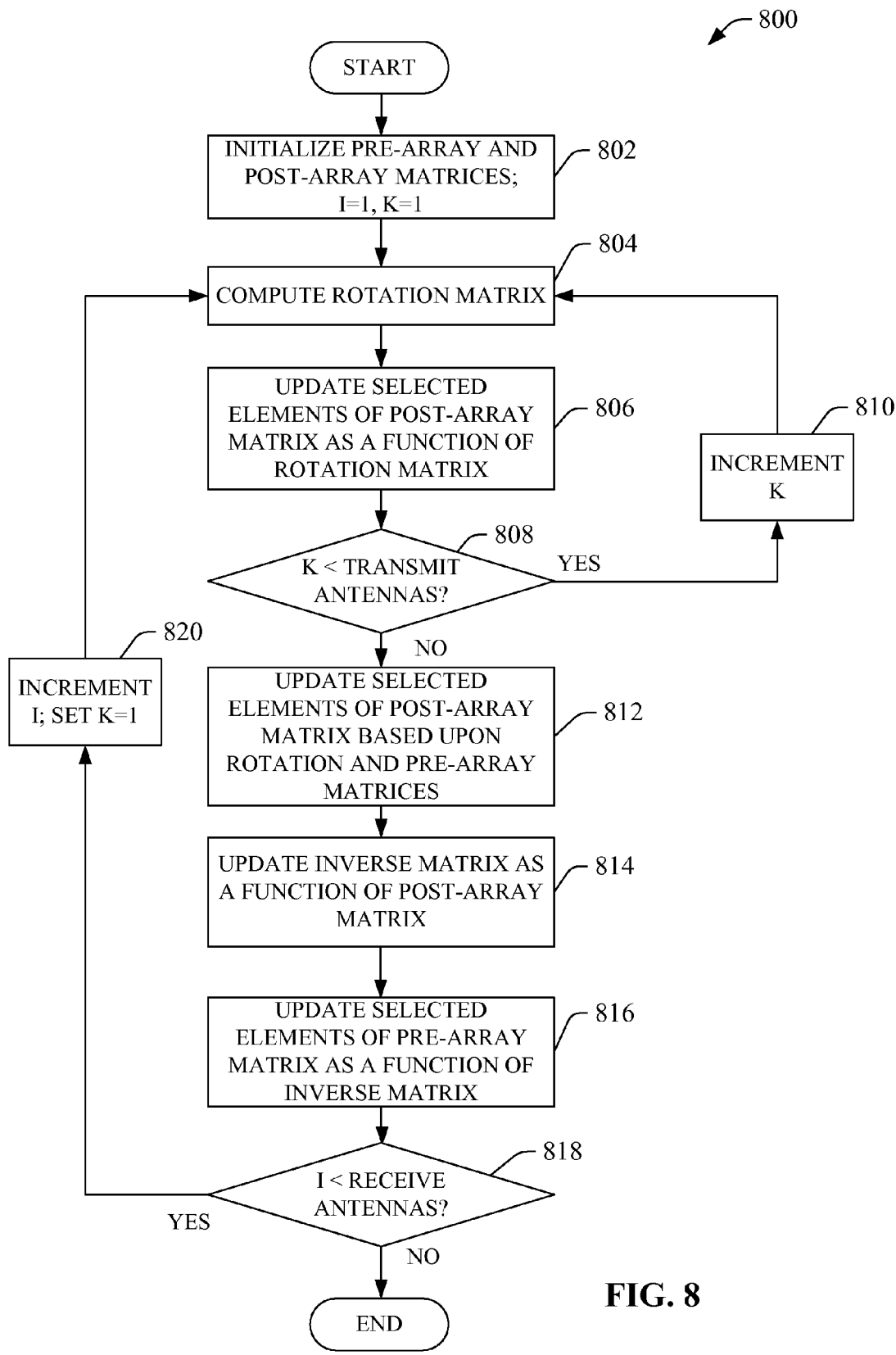
FIG. 8 illustrates an example methodology for equalizing a received signal utilizing a modified fast square root method in accordance with one or more aspects presented herein.

FIG. 8 illustrates an example method 800 for computing an inverse matrix. A variation of the fast square root method which reduces computational complexity can be utilized. At act 802, the pre-array and post-array matrices are initialized in preparation for computation of the inverse matrix. In addition, counter variables i and k, representing receive antennas and transmit antennas, respectively, can be initialized (e.g., i=1 and k=1). Pre-array matrix can be initialized based upon computation of vector a:

$$a = \hat{H}_i(n) \hat{P}_{|i-1}(n)^{1/2}$$

The post-array matrix can be initialized to the pre-array matrix.

After initialization, the post-array and pre-array matrices are iteratively updated for transmit and receive antennas. At 804, a rotation matrix is computed for the iteration. In particular, the rotation matrix can be derived from elements of the post-array matrix as described in detail above in connection with FIG. 5. At 806, selected elements of the post-array matrix can be updated based upon the rotation matrix (e.g., $Y \leftarrow Y \times \theta_i^k$). At act 808, a determination is made as to whether processing has been completed for each transmit antenna (e.g., k<$M_T$). If processing is not complete, at act 810 the variable k for the transmit antennas is incremented, and processing continues at act 804, where the rotation matrix is computed for the next transmit antenna.

If processing is complete for the transmit antennas, the post-array can be updated based upon the rotation matrix and the pre-array matrix (e.g., Y=X$\Theta_i$) at act 812. At act 814, the inverse matrix can be updated as a function of a post-array matrix (e.g., $\hat{P}_{|i}(n)^{1/2} = Y_{2:M_T, 2:M_T}$). Elements of the pre-array matrix are updated based upon the inverse matrix at act 816.

At act 818, a determination is made as to whether processing has been completed for each receive antenna (e.g., i<$M_R$). If processing is not complete, at act 820 the variable i for the receive antennas is incremented, the variable for the transmit antennas is reset (e.g., k=1) and processing continues at act 804, where the rotation matrix is computed for the next receive antenna. If processing has been completed for each receive antenna, an inverse matrix has been computed and can be used to generate an equalizer matrix to perform equalization of a signal.

Figure 9:
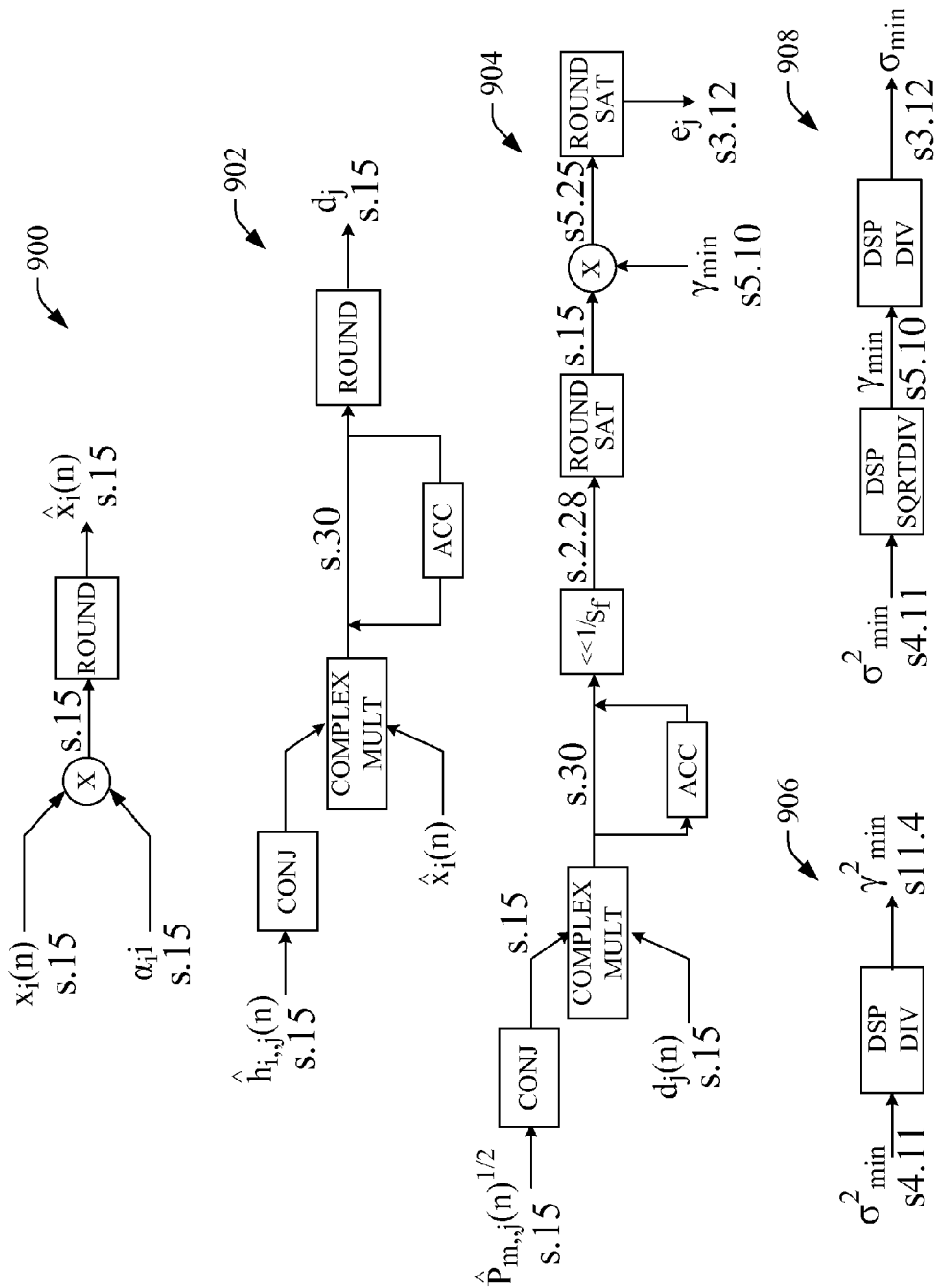
FIG. 9 depicts block diagrams of equalization processes in accordance with one or more aspects presented herein.
Figure 10:
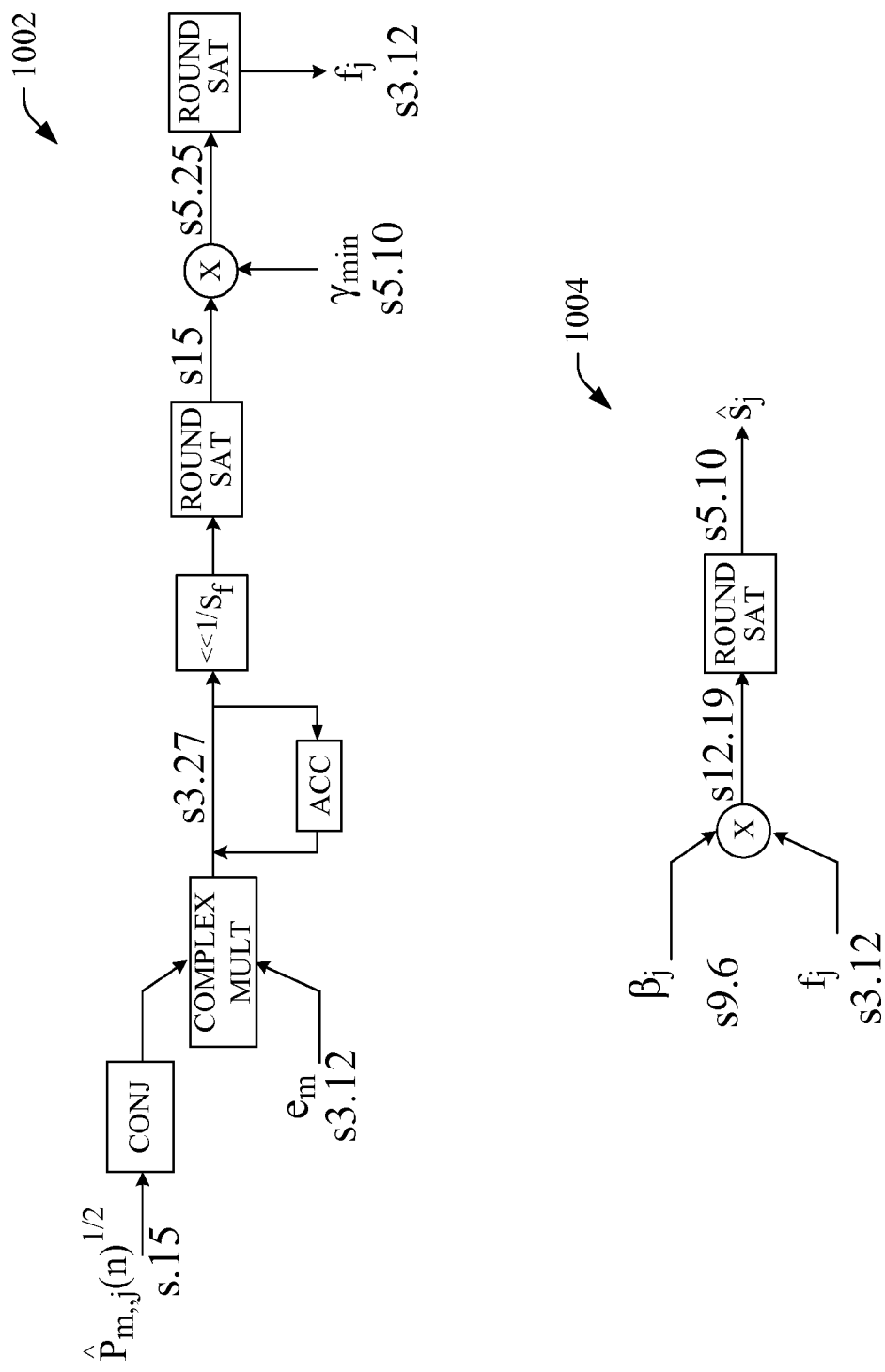
FIG. 10 depicts block diagrams of additional equalization processes in accordance with one or more aspects presented herein.
Figure 11:
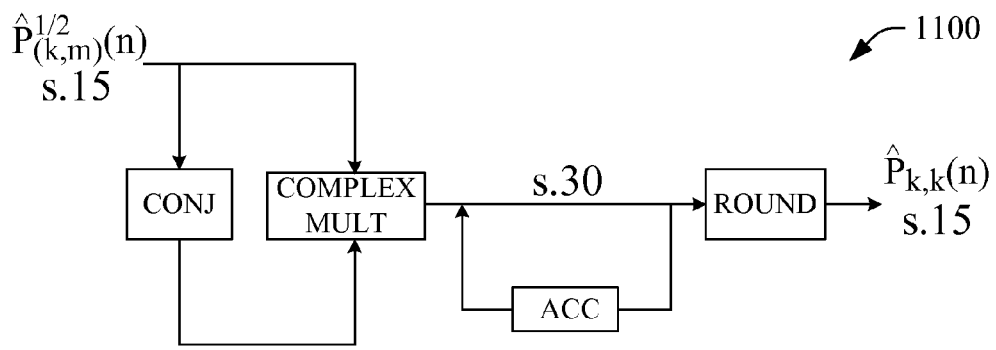
FIG. 11 depicts block diagrams of further equalization processes in accordance with one or more aspects presented herein.
Figure 11:
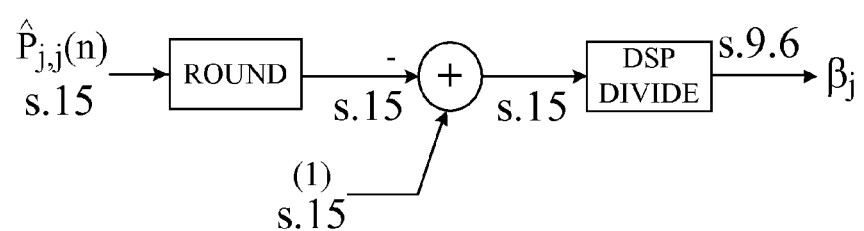
Figure 11:
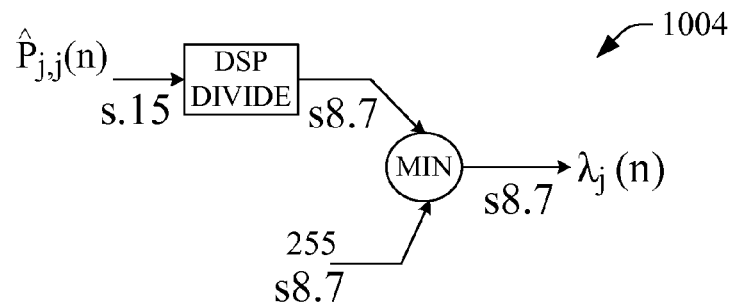

Referring now to FIGS. 9, 10 and 11, diagrams illustrating calculation of equalized symbols are depicted. Equalized symbols can be denoted as follows:

$$\tilde{s}(n) = G(n) \hat{x}(n)$$

Here, $\tilde{s}(n)$ represents normalized, equalized symbols for tone n, G(n) is the equalizer matrix, and $\hat{x}(n)$ is the scaled, received signal for tone n. Diagram 900 illustrates operations to scale input signal, $\hat{x}(n)$. The following example pseudocode can be used to normalize the received signal by a scaling vector $\alpha_i$:

for i=1:$M_R$, $\hat{x}_i(n) = x_i(n) \times \alpha_i$ end;

Here, $\alpha_i$ can be denoted as follows:

$$\alpha_i = \frac{\sigma_{min}}{\sigma_i}, \; i = 1, 2, 3 \ldots M_R$$

As discussed above, the equalizer matrix can be denoted as follows:

$$G(n) = \Lambda(n)^{-1} P(n)^{1/2} P(n)^{*1/2} \hat{H}(n)^*$$

Resulting in the following equation for equalized symbols:

$$\tilde{s}(n) = \Lambda(n)^{-1} P(n)^{1/2} P(n)^{*1/2} \hat{H}(n)^* \hat{x}(n)$$

Equalized symbols can be computed in stages, as shown in FIGS. 9, 10 and 11. In particular, in a first stage a vector d can be computed as follows:

$$d = \hat{H}(n)^* \hat{x}(n)$$

Diagram 902 illustrates operations that can be used to generate vector d. The following example pseudocode can be used to generate d:

```
for j = 1 : M_T,
    acc_C = 0
    for i = 1 : M_R,
        acc_C = acc_C + ĥ_{i,j}*(n) * x̂_i(n)
    end;
    d_j = acc_C
end;
```

During the second stage, an R×1 vector e, can be computed as follows:

$$e = \frac{1}{s_f} \gamma_{min} P(n)^{*1/2} d$$

Here, $s_f$ is a scaling factor and $\gamma_{min}$ is a normalization factor. Diagram 904 illustrates operations that can be used to generate vector e. Normalization factor $\gamma_{min}$ can be computed as follows:

$$\gamma_{min}^2 = \frac{1}{\sigma_{min}^2}$$

Diagram 906 depicts a bit-exact implementation for computing $\gamma^2_{min}$. The following operation can be performed once per tile:

$$\sigma_{min} = \frac{1}{\sqrt{\gamma_{min}^2}}$$

Diagram 908 depicts a bit exact implementation for computing $\sigma_{min}$. The following example pseudocode can be used to generate e as follows:

```
for j = 1 : M_T,
    acc_C = 0
    for m = 1 : j,
        acc_C = acc_C + conj[P̂_{m,j}(n)^{1/2}] * d_m
    end;
    e_j = acc_C × γ_min × 1/s_f
end;
```

During stage three, an R×1 vector f can be computed as follows:

$$f = \frac{1}{s_f} \gamma_{min} P(n)^{1/2} e$$

Here, $s_f$ is a scaling factor and $\gamma_{min}$ is a normalization factor. Normalization factor $\gamma_{min}$ can be computed as described above. Diagram 1002 depicts operations that can be used to generate vector f. The following example pseudocode can also be used to generate f:

```
for j = 1:M_T,
    acc_C = 0
    for m = j:M_T,
        acc_C = acc_C + P̂_{j,m}(n)^{1/2} * e_m
    end;
    f_j = acc_C × γ_min × 1/s_f
end;
```

During the final stage an R×1 vector of the equalized signal $ŝ_j$ can be generated as follows:

$ŝ_j = β_j f_j, j=1, 2, \ldots M_T$

Diagram 1004 depicts operations for computing the equalized symbol $ŝ_j$ and the following example pseudocode can be used to generate such equalized symbols:

for j=1:$M_T$, $ŝ_j = β_j * f_j$ end;

Here, $β_j$ can be utilized for bias correction, where $β_j$ can be obtained from the diagonal matrix elements of $P̂(n)$, computed as:

$$P̂_{jj}(n) = \sum_{m=1}^{R} P̂_{j,m}(n)^{1/2} \left[P̂_{j,m}(n)^{1/2}\right]^*$$

Diagram 1100 depicts operations to compute $P̂_{jj}(n)$. The following exemplary pseudocode can be used to obtain the diagonal elements:

```
for k = 1 : M_T,
    acc_C = 0
    for m = 1 : M_T,
        acc_C = acc_C + ĥ_{i,m}(n)P̂_{|i-1,(m,k)}(n)
    end;
    a_k = acc_C;
end;
```

Where $β_j$ can be expressed as follows:

$$β_j = \frac{1}{1 - P̂_{j,j}(n)}$$

$j = 1, 2, \ldots R$

Diagram 1102 depicts operations for computing $β_j$. The MMSE post-processing SINRs can be used for the weighting the log-likelihood ratios (LLR) and are readily obtained from the diagonal elements of the P matrix computed:

$$λ_j = \min\left[\frac{1}{P̂_{jj}(n)} - 1, 255\right]$$

$j = 1, 2, \ldots R$

Diagram 1104 depicts operations for computing $λ_j$.

Figure 12:
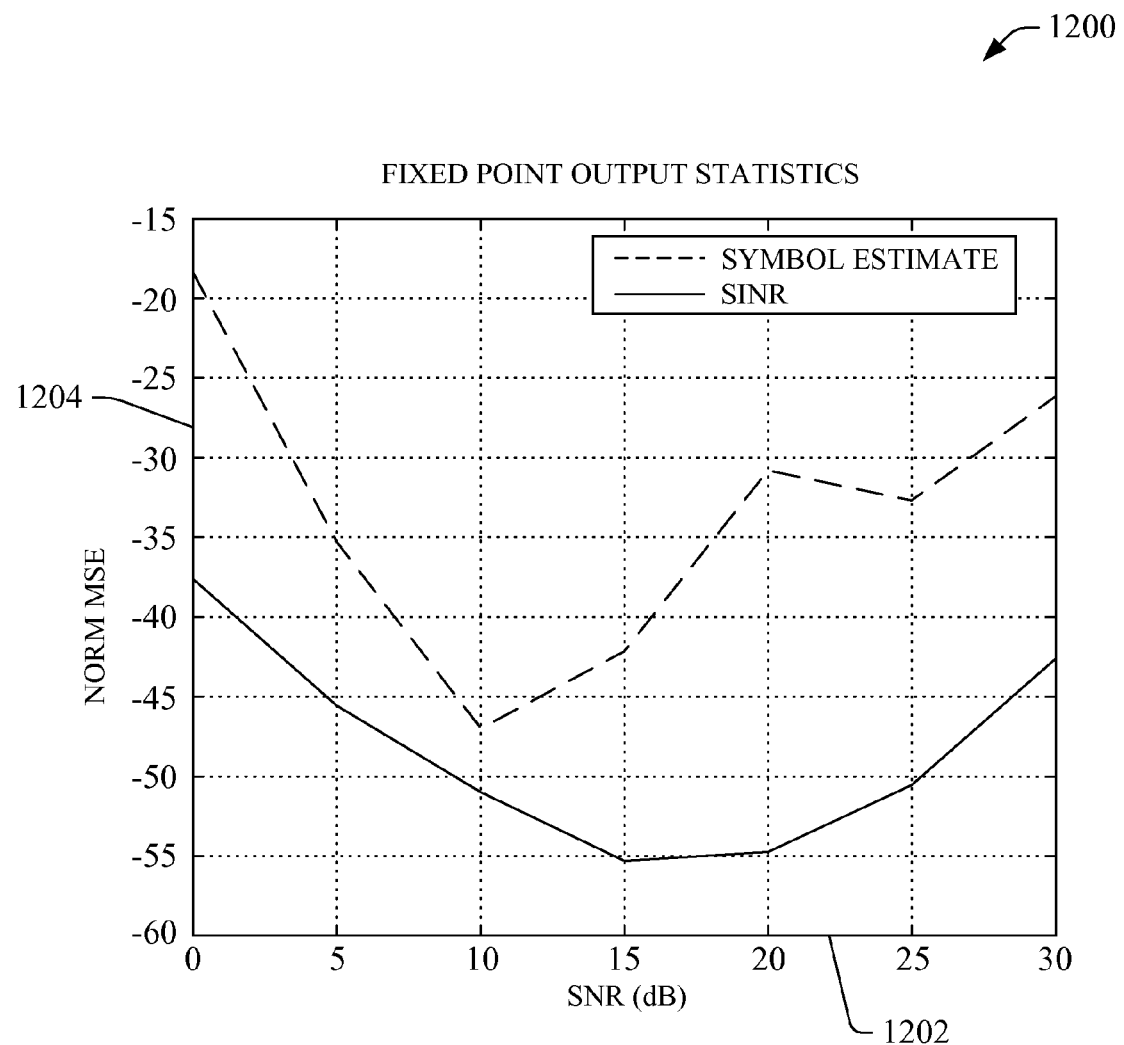
FIG. 12 presents a graph depicting results of equalization utilizing using the modified fast square root method in accordance with one or more aspects presented herein.

Turning now to FIG. 12, results of a simulation of equalization that utilizes using the modified fast square root method are illustrated. A preliminary simulation can be performed to validate bit-widths, utilizing four transmit and receive antennas. Noise variance per receive antenna can be varied (e.g., 0. −3, −6 and −10 dB), with respect to a mean SNR range of 0 dB to 30 dB. Channel matrix, H, elements are assumed to be IID Gaussian with a mean of zero and variance of one. Inputs of channel elements and received signal are assumed to be scaled by a factor of ¼. The normalized mean squared error (MSE) between bit-accurate and floating-point output(s) can be computed as follows:

$$NMSE[\hat{s}(n)] = E_{j,n}\left[1 - \left\|\frac{\hat{s}_j^{float}(n)}{\hat{s}_j(n)}\right\|\right]^2$$

$$NMSE[\Lambda(n)] = E_{j,n}\left[1 - \left\|\frac{\lambda_j^{float}(n)}{\lambda_j(n)}\right\|\right]^2$$

Graph 1200 can be generated using a fixed-point simulation (e.g., using Matlab fixed point toolbox). Here, the x-axis 1202 represents the signal to noise ratio (SNR), while the y-axis 1204 represents the normalized MSE. It should be noted that the per-layer SINR (at the output of a MMSE receiver) is at least 6 dB below the receive SNR per antenna. For example, at 30 dB SNR, the per-layer SINR is less than 24 dB. Typically, for IID channels MIMO channels, the per-layer SNIR can be much smaller than 24 dB. Accordingly, a normalized MSE of −25 dB may be acceptable.

It will be appreciated that inferences can be made regarding classification of terminal, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
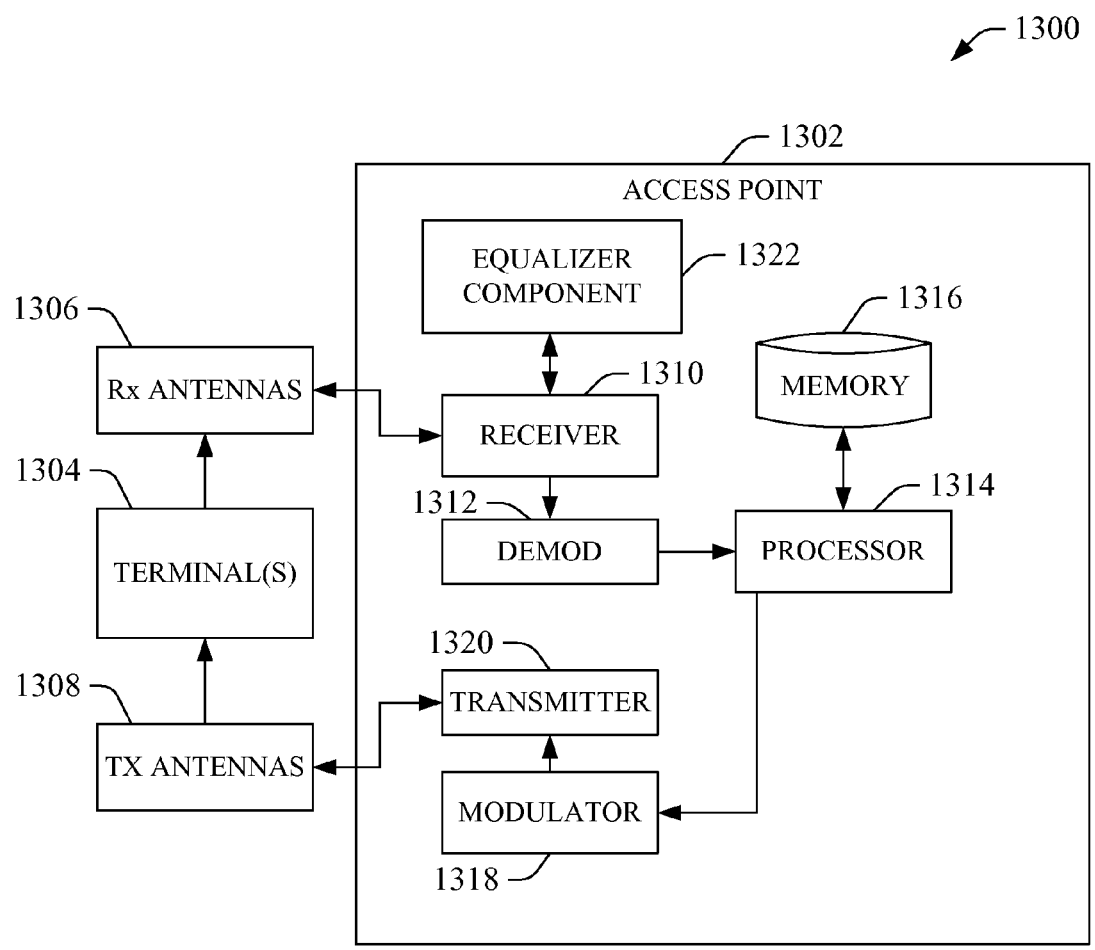
FIG. 13 is an illustration of an example wireless communication system in accordance with one or more aspects presented herein.

FIG. 13 is an illustration of a system 1300 that facilitates equalization in a communication environment in accordance with various aspects. System 1300 comprises an access point 1302 with a receiver 1310 that receives signal(s) from one or more terminals 1304 through one or more receive antennas 1306, and transmits to the one or more terminals 1304 through a one or more transmit antennas 1308. In one or more aspects, receive antennas 1306 and transmit antennas 1308 can be implemented using a single set of antennas. Receiver 1310 can receive information from receive antennas 1306 and is operatively associated with a demodulator 1312 that demodulates received information. Receiver 1310 can be an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Access point 1302 further comprises an equalizer component 1322, which can be a processor distinct from, or integral to, receiver 1310. Equalizer component 1322 can utilize the modified fast square root method as described hereinbefore to reduce the complexity of computations required to equalize received signals.

Demodulated symbols are analyzed by a processor 1314. Processor 1314 is coupled to a memory 1316 that stores information related to equalization, such as the equalizer function, equalizer matrices, and any other data related to equalization. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1310 of the subject systems and methods is intended to comprise, without being limited to, these and any other suitable types of memory. Receiver output for each antenna can be jointly processed by receiver 1310 and/or processor 1314. A modulator 1318 can multiplex the signal for transmission by transmitter 1320 via transmit antennas 1308 to terminals 1304.

Figure 14:
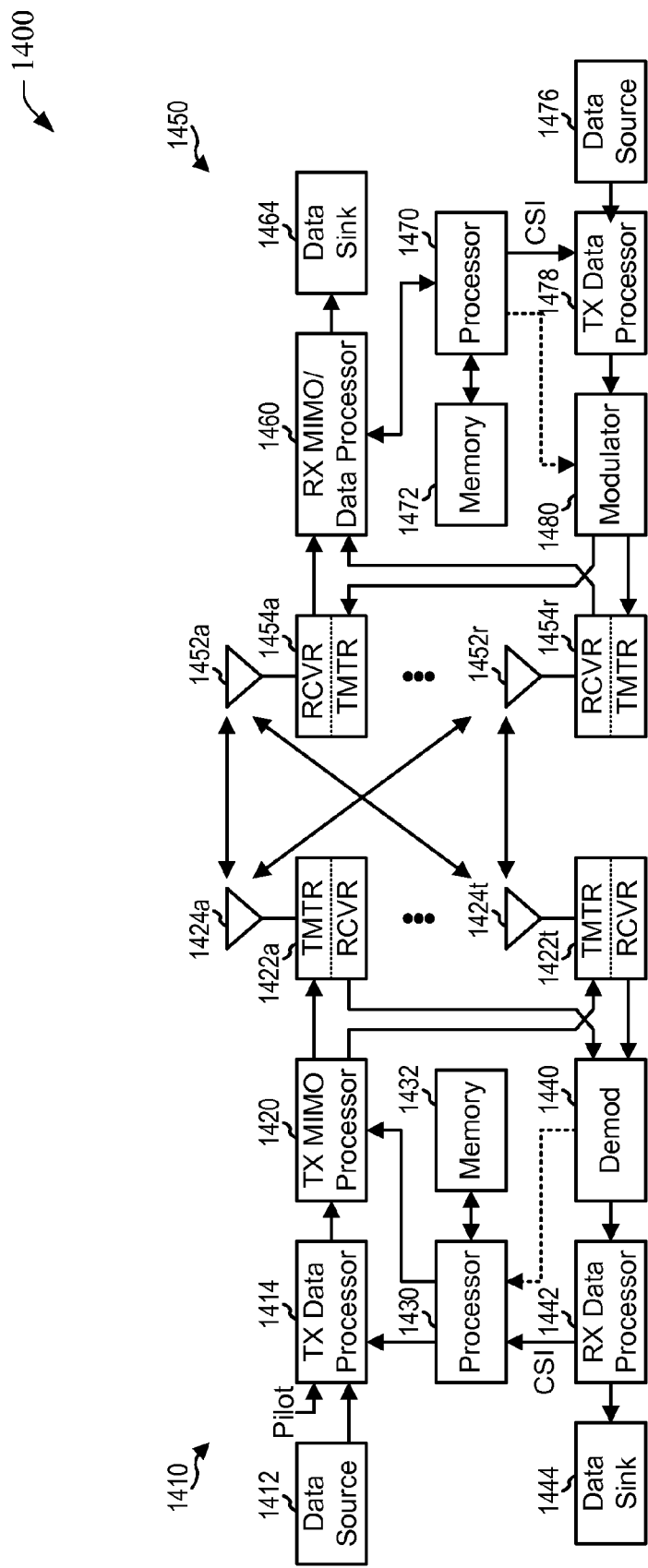
FIG. 14 is an illustration of an example wireless communication environment that can be employed in conjunction with the various systems and methods described herein.

Referring to FIG. 14, one embodiment of a transmitter and receiver in a multiple access wireless communication system is illustrated, 1400. At transmitter system 1410, traffic data for a number of data streams is provided from a data source 1412 to a transmit (TX) data processor 1414. In an embodiment, each data stream is transmitted over a respective transmit antenna. TX data processor 1414 formats, codes, and interleaves the traffic data for each data stream based on a particular coding scheme selected for that data stream to provide coded data. In some embodiments, TX data processor 1414 applies precoding weights to the symbols of the data streams based upon the user and the antenna from which the symbols are being transmitted. In some embodiments, the precoding weights may be generated based upon an index to a codebook generated at the transceiver, 1454 and provided as feedback to the transceiver, 1422, which has knowledge of the codebook and its indices. Further, in those cases of scheduled transmissions, the TX data processor 1414 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1430. As discussed above, in some embodiments, the packet format for one or more streams may be varied according to the rank information that is transmitted from the user.

The modulation symbols for all data streams are then provided to a TX MIMO processor 1420, which may further process the modulation symbols (e.g., for OFDM). TX MIMO processor 1420 then provides $N_T$ modulation symbol streams to $N_T$ transceivers (TMTR) 1422a through 1422t. In certain embodiments, TX MIMO processor 1420 applies precoding weights to the symbols of the data streams based upon the user to which the symbols are being transmitted to and the antenna from which the symbol is being transmitted from that user channel response information.

Each transceiver, 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422a through 1422t are then transmitted from $N_T$ antennas 1424a through 1424t, respectively.

At receiver system 1450, the transmitted modulated signals are received by $N_R$ antennas 1452a through 1452r and the received signal from each antenna 1452 is provided to a respective transceiver, (RCVR) 1454. Each transceiver 254 conditions (e.g., filters, amplifies, and downconverts) a respective received signal, digitizes the conditioned signal to provide samples, and further processes the samples to provide a corresponding "received" symbol stream.

An RX data processor 1460 then receives and processes the $N_R$ received symbol streams from $N_R$ transceivers 1454 based on a particular receiver processing technique to provide $N_T$ "detected" symbol streams. The processing by RX data processor 1460 is described in further detail below. Each detected symbol stream includes symbols that are estimates of the modulation symbols transmitted for the corresponding data stream. RX data processor 1460 then demodulates, deinterleaves, and decodes each detected symbol stream to recover the traffic data for the data stream. The processing by RX data processor 1460 is complementary to that performed by TX MIMO processor 1420 and TX data processor 1414 at transmitter system 1410.

The channel response estimate generated by RX processor 1460 may be used to perform space, space/time processing at the receiver, adjust power levels, change modulation rates or schemes, or other actions. RX processor 1460 may further estimate the signal-to-noise-and-interference ratios (SINRS) of the detected symbol streams, and possibly other channel characteristics, and provides these quantities to a processor 1470. RX data processor 1460 or processor 1470 may further derive an estimate of the "operating" SINR for the system. Processor 1470 then provides estimated (CSI), which may comprise various types of information regarding the communication link and/or the received data stream. For example, the CSI may comprise only the operating SINR. The CSI is then processed by a TX data processor 1478, which also receives traffic data for a number of data streams from a data source 1476, modulated by a modulator 1480, conditioned by transceivers 1454a through 1454r, and transmitted back to transmitter system 1410.

At transmitter system 1410, the modulated signals from receiver system 1450 are received by antennas 1424, conditioned by receivers 1422, demodulated by a demodulator 1440, and processed by a RX data processor 1442 to recover the CSI reported by the receiver system. The reported quantized information e.g. CQI is then provided to processor 1430 and used to (1) determine the data rates and coding and modulation schemes to be used for the data streams and (2) to generate various controls for TX data processor 1414 and TX MIMO processor 1420.

The techniques described herein may be implemented by various means. For example, these techniques may be implemented in hardware, software, or a combination thereof. For a hardware implementation, the processing units (e.g., controllers 1120 and 1160, TX and RX processors 1114 and 1134, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 15:
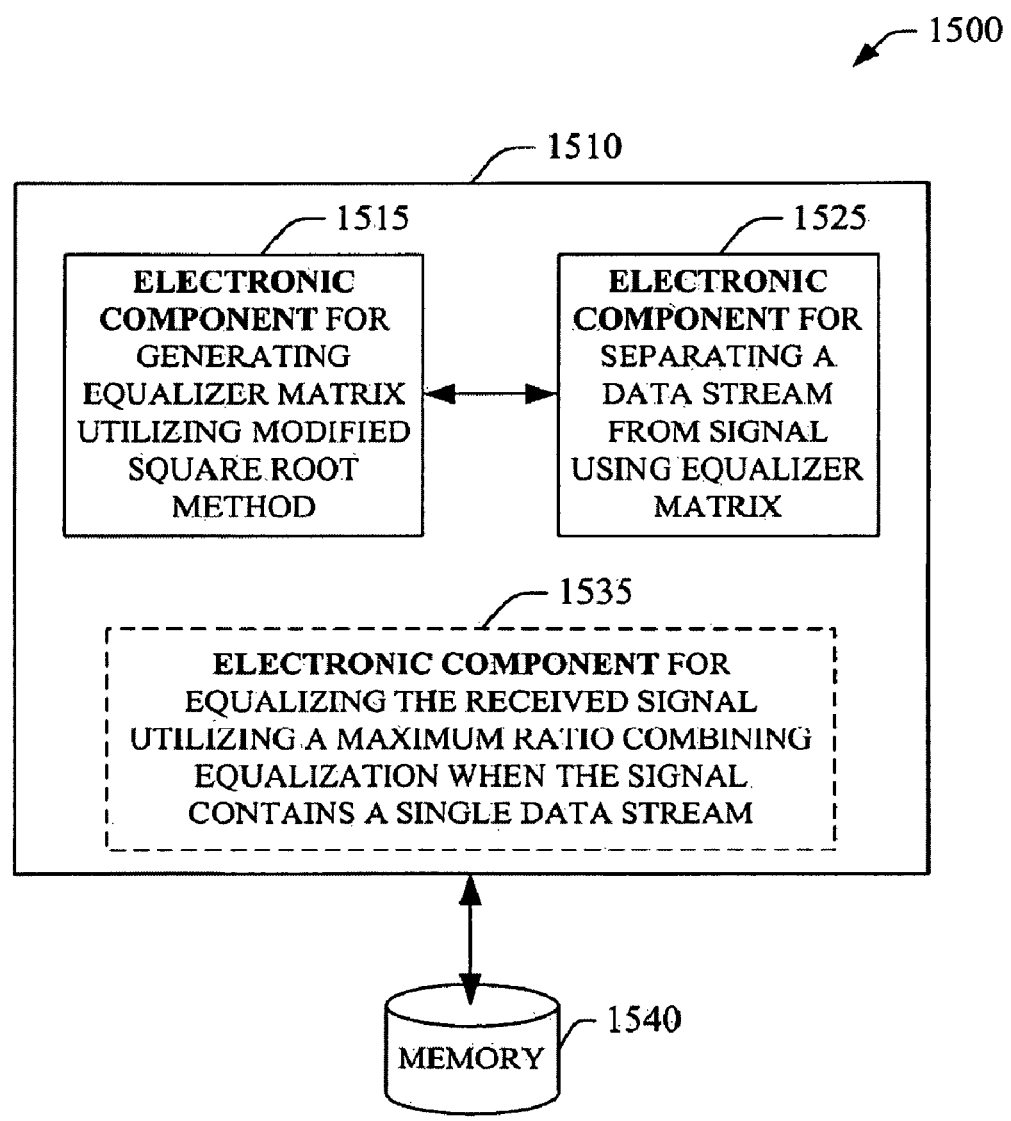
FIG. 15 is an illustration of an example system that facilitates equalization in accordance with one or more aspects presented herein.

Referring now to FIG. 15, an example system 1500 that enables the equalization of received signals utilizing a modification of the square root method according to aspects described herein is illustrated. System 1500 includes a logical grouping 1510 of electronic components that can act in conjunction to achieve said equalization. In an aspect, logical grouping 1510 includes an electronic component 1515 can generate an equalizer matrix for each tone or subcarrier of a received signal. The equalizer matrix is generated using an equalizer function that is based at least in part upon an inverse matrix. The inverse matrix can be computed using a modification of the fast square root method, where only a portion of the fast square root matrix is updated during iterative processing. This partial update reduces required computations and improves performance. In addition, dynamic requirements for processing can be reduced by modifying initialization of the fast square root matrix as a function of interference variance. In addition, logic grouping 1510 includes electronic component 1525 can utilize a generated equalizer matrix to separate one or more data streams included within a subcarrier of the received signal. Each subcarrier can be equalized using the corresponding equalizer matrix. Once separated the individual data streams can be separately processed to obtain data symbols. Furthermore, an electronic component 1535 can equalize the received signal utilizing a maximum ratio combining equalization when the signal contains a single data stream.

System 1500 can also include a memory 1540 that retains instructions for executing functions associated with electrical components 1515, 1525 and 1535, as well as measured and computed data that may be generated during executing such functions. While shown as being external to memory 1540, it is to be understood that one or more of electronic components 1515, 1525 and 1535 can reside within memory 1540.

Methodologies for performing equalization are illustrated in the subject description (FIG. 2 and FIG. 8). It is noted that while for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the terms "includes" or "including" or any variation thereof is employed in either the detailed description or the claims, such term is intended to be inclusive in a manner similar to the term "comprising" as "comprising" is interpreted when employed as a transitional word in a claim.

What is claimed is:

1. A method for facilitating equalization in a receiver chain in a wireless communication system, the method comprising:
   in the case that a received signal contains multiple data streams, generating an equalizer matrix for a tone of the received signal, wherein the equalizer matrix is a function of an inverse matrix computed based at least in part upon a partial update of a subset of elements of a fast square root matrix, modifying the fast square root matrix so as to reduce a dynamic range requirement, and equalizing the tone as a function of the equalizer matrix; and
   performing maximum ratio combining equalization in the case that the received signal contains a single data stream.

2. The method of claim 1, wherein the fast square root matrix is a pre-array matrix.

3. The method of claim 1, wherein the fast square root matrix is a post-array matrix.

4. The method of claim 1, further comprising generating a logging packet that includes symbols derived from the equalized tone.

5. An apparatus that facilitates equalization in a wireless communication environment, the apparatus comprising:
   a processor configured to compute an inverse matrix based at least in part upon an iterative partial update of a fast square root matrix, modify the fast square root matrix so as to reduce a dynamic range requirement, to compute an equalizer matrix as a function of the inverse matrix, and to obtain at least one data stream from a received signal utilizing the equalizer matrix in the case that the received signal contains multiple data streams,
   the processor being further configured to perform maximum ratio combining equalization in the case that the received signal contains a single data stream
   a memory coupled to the processor.

6. The apparatus of claim 5, wherein the fast square root matrix is at least one of a pre-array matrix or a post array matrix.

7. A device that that facilitates equalization of a signal in a wireless environment, the device comprising:
   means for generating an equalizer matrix utilizing a modified fast square root method that updates a subset of the fast square root matrix during iterative processing;
   means for modifying the fast square root matrix so as to reduce a dynamic range requirement;
   means for separating at least one data stream in a received signal utilizing the equalizer matrix in the case that the received signal contains multiple data streams; and
   means for performing maximum ratio combining equalization in the case that the received signal contains a single data stream.

8. The device of claim 7, wherein the fast square root matrix is at least one of a pre-array matrix or a post-array matrix.

9. A computer program product including a non-transitory computer-readable medium comprising:
   code for causing a computer to calculate an equalizer matrix for a tone of a received signal, wherein calculation of the equalizer matrix is based upon iterative partial update of a fast square root matrix;
   code for causing a computer to modify the fast square root matrix so as to reduce a dynamic range requirement;
   code for causing a computer to equalize the received signal as a function of the equalizer matrix in the case that the received signal contains multiple data streams; and
   code for causing a computer to perform maximum ratio combining equalization in the case that the received signal contains a single data stream.

10. The computer program product of claim 9, wherein the fast square root matrix is at least one of a pre-array matrix or a post-array matrix.

11. The method of claim 1, wherein the fast square root matrix is specified as function of an interference variance.

12. The apparatus of claim 5, wherein the fast square root matrix is specified as a function of an interference variance.

13. The device of claim 7, wherein the fast square root matrix is specified as a function of an interference variance.

14. The computer program product of claim 9, wherein the fast square root matrix is specified as a function of an interference variance.

* * * * *